United States Patent [19]
DeLand, Jr.

[11] Patent Number: 5,767,495
[45] Date of Patent: Jun. 16, 1998

[54] REDUCED-POWER MAGNETIC TRANSDUCER SYSTEM UTILIZING A MAGNETORESISTIVE HEAD

[75] Inventor: Robert S. DeLand, Jr., Torrance, Calif.

[73] Assignee: Mag-Tek, Inc., Carson, Calif.

[21] Appl. No.: 681,947

[22] Filed: Jul. 29, 1996

[51] Int. Cl.[6] .............. G06K 19/06; G06K 7/08; G11B 25/04; G11B 5/127

[52] U.S. Cl. .............. 235/449; 360/2; 360/113; 235/493

[58] Field of Search ................ 235/449, 486, 235/487, 493; 360/2, 41, 113, 104, 126; 324/327, 328, 118 R

[56] References Cited

U.S. PATENT DOCUMENTS

| | | | |
|---|---|---|---|
| 4,318,186 | 3/1982 | Wynn | 365/8 |
| 4,520,311 | 5/1985 | Petr et al. | 324/117 R |
| 4,791,285 | 12/1988 | Ohki | 235/449 |
| 4,797,938 | 1/1989 | Will | 235/449 |
| 4,798,322 | 1/1989 | Bernstein et al. | 235/449 |
| 4,807,074 | 2/1989 | Kamo | 360/113 |
| 4,825,056 | 4/1989 | Ohta et al. | 235/449 |
| 5,001,331 | 3/1991 | Leestemaker | 235/449 |
| 5,083,013 | 1/1992 | Levionnais | 235/449 |
| 5,155,643 | 10/1992 | Jones, Jr. et al. | 360/113 |
| 5,293,031 | 3/1994 | Goto et al. | 235/449 |
| 5,561,896 | 10/1996 | Voegeli et al. | 29/603 |

*Primary Examiner*—Donald T. Hajec
*Assistant Examiner*—Thien Minh Le
*Attorney, Agent, or Firm*—Darby & Darby, PC

[57] ABSTRACT

A reduced-power dynamic magnetic transducer system includes a magnetoresistive read head, a low duty cycle pulse generator to supply power to the head, a signal processor, and a controller. As a data-bearing card is moved adjacent to the magnetoresistive read head, the pulse generator actuates the read head, thereby providing an intermittent signal representative of data recorded on the card. The intermittent signal is processed by the signal processor to reconstruct the original recorded data. The reconstructed data is utilized by the controller in conducting transactions with a user of the system.

14 Claims, 2 Drawing Sheets

REDUCED-POWER MAGNETIC TRANSDUCER SYSTEM UTILIZING A MAGNETORESISTIVE HEAD

BACKGROUND OF THE INVENTION

The invention relates to magnetic transducer systems, and in particular to dynamic magnetic transducer systems utilizing magnetoresistive technology to read digital data from magnetic media, for example data-bearing magnetic cards.

As is well known in the art, magnetoresistive material can be used to sense, or read, recorded information or data from a magnetic medium. Essentially, the electrical resistance of magnetoresistive material varies according to the intensity of an adjacent magnetic field. This property of the material can be detected by electronic circuitry. Contemporary magnetoresistive read head technology is centered on these principles.

Digital data can be written on a magnetic medium as a series of alternating magnetic polarity transitions or "poles." Just as a common permanent bar magnet has a "north" pole and a "south" pole, between which a magnetic field flares out, so appears digital data as recorded on a magnetic medium. Each side of a polarity transition on the magnetic medium may be considered a pole in a series of magnets laid end to end, with like poles abutting each other at the transitions.

The recorded magnetic medium, then, like a series of permanent magnets, exhibits a series of magnetic fields between opposing poles. These fields can be sensed by a traditional read head as the magnetic medium passes adjacent to the head. In the case of a magnetoresistive read head, the magnetic fields from the medium affect the resistance of the material and are sensed even without relative motion.

Like a traditional inductive head, a magnetoresistive head can be used to accurately recover information recorded on a magnetic medium in the form of a magnetic pattern, i.e. a sequence of magnetic polarity transitions. The two types of heads are usable in many of the same magnetic signal-reading applications. However, magnetoresistive read heads have the advantages that they offer the possibility that they can be made smaller, faster, and higher in resolution than traditional inductive heads.

Generally, in the operation of sensing a magnetic medium, an electrical current is applied through the magnetoresistive ("MR") head to create a varying output signal. As the magnetic field at the head varies, the electrical current is modulated by the changing resistance of the magnetoresistive material to provide a responsive signal. That is, the current through the MR head varies with respect to the magnetic field intercepted by the head.

In operation, to sense magnetic fields, an MR head circuit may consume a relatively substantial amount of power. For example, a typical MR head can require from five to seven milliamperes when operating at five volts. This characteristic is an obstacle to power conservation and miniaturization.

Because traditional inductive read heads generally do not consume significant power, MR heads raise a relative disadvantage with regard to power conservation. However, as discussed above, MR heads offer advantages in other areas, such as small size, high resolution, and high speed. Thus, a need exists for a transducer which would combine the advantageous attributes of an MR head, namely the improved size, speed, and resolution, with low-power capabilities comparable to those of a traditional inductive head.

Such a transducer could provide improved performance in systems which must utilize less power, for example systems that are battery operated or highly miniaturized.

SUMMARY OF THE INVENTION

A dynamic magnetic transducing apparatus according to the present invention offers improved efficiency and reduced power consumption by enabling a magnetoresistive head to be driven intermittently. In a transducer system according to the present invention, a power source pulses the magnetoresistive head to produce an intermittent output signal, thereby decreasing the average power consumed in comparison to a comparable non-pulsed (steady-state) magnetoresistive transducer system.

Specifically, as disclosed herein, the power source may take the form of a pulse generator with a short duty cycle and a frequency significantly higher than any upper frequency of interest in the information to be sensed from the magnetic medium. Power pulses drive the MR head for short intervals, during which time samples are taken of the magnetic field presently adjacent to the head. A signal processor utilizes the samples from power pulses to reproduce the information recorded on the magnetic medium.

In this way, the average power requirements of the MR head are reduced somewhat proportionally to the duty cycle of the pulse generator. As long as the frequency of the pulse generator is significantly higher than the highest frequency of interest in the recorded magnetic pattern, after appropriate signal processing, the fidelity of the reproduced signal should be reasonable.

As indicated above, magnetoresistive heads generally do not require relative motion with a magnetic medium to provide an output signal. That is, an MR head does not involve an induced electrical signal, as results from motion of a conductor in a magnetic field. Consequently, in transducing a magnetic medium, the MR head generally is moved in relation to the magnetic field simply to scan the medium, but not necessarily to induce a signal.

In accordance with the present invention, then, by scanning the magnetic medium, a transducing system senses the information stored on the medium. Such recovered information may be utilized in any matter desired. For example, an apparatus according to the present invention can be configured in an automatic teller machine, including an enclosure accommodating a keypad and a display for interaction with a user. The present invention is equally well suited for use in a variety of other applications, such as identification terminals, credit card processing terminals, or any device required to read information from a card or other magnetic medium.

BRIEF DESCRIPTION OF THE DRAWINGS

In the drawings, which constitute a part of this specification, an exemplary embodiment exhibiting various objectives and features hereof is set forth, specifically.

DETAILED DESCRIPTION OF THE PREFERRED EMBODIMENT

As required, a detailed illustrative embodiment of the present invention is disclosed herein. However, a dynamic magnetic transducing system in accordance with the present invention may be embodied in a wide variety of forms, some of which may be quite different from those of the preferred embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
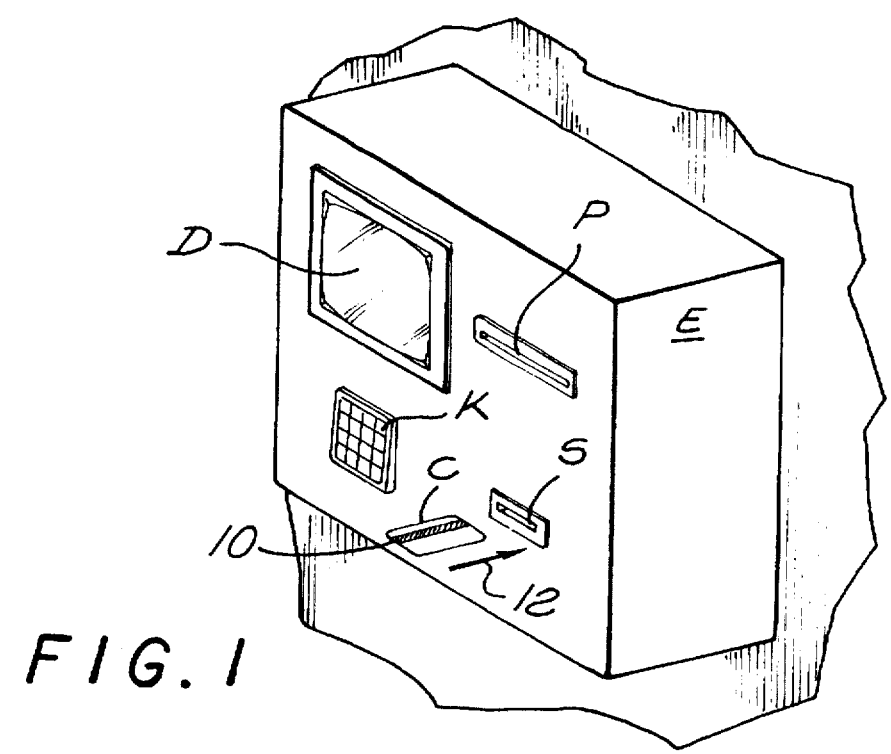
FIG. 1 is a perspective view of an interactive card processing terminal embodying a system according to the present invention.

Referring initially to FIG. 1, the exterior of an exemplary interactive card processing terminal embodying the present invention is shown. The terminal defines a card slot S, which is adapted to accept a card C bearing a magnetically encoded stripe 10. Such cards are variously used in identification or transaction-related applications. The stripe 10 carries at least one magnetic track recorded with digital information. For example, the stripe 10 can carry data representative of the card holder's identity, encrypted card authentication codes, bank account information, credit information, access keys, and other critical data.

The card processing terminal is housed in an enclosure E, which can contain a variety of electronic and/or mechanical components for operation in cooperation with the card C. For example, the enclosure E generally contains components to implement the functional blocks illustrated in FIG. 2. By way of illustration, the enclosure E also can contain a currency handling and dispensing apparatus, a receipt printer, a communications link adapted to connect the terminal to a central database, and various other items of support and optional equipment. In accordance with the disclosed embodiment, with insertion of the card C, various operations may be accomplished. For example, if the card is being properly used and data is appropriately entered through a keypad K as cued by a display D, cash may be dispensed through a passage P.

In the operation of the exemplary system, a user inserts the card C into the terminal via the slot S in the direction of an arrow 12. The card C is accepted into the interior of the enclosure E, and the terminal senses the digital data from the encoded stripe 10. The terminal may, by displaying messages to the user on the display D, cue the user to enter any desired information by using the keypad K. Such information can then be used by the terminal in conjunction with the digital data read from the stripe 10 to process a transaction. As indicated above, such a transaction can involve, for example, dispensing cash, allowing cash-free financial transactions, providing access to a secure area, or unlocking access to a database or computer system.

At the end of the transaction, the card C may be returned to the user through the slot S or retained within the enclosure E, as required by the particular transaction. It should be noted that numerous other types of transactions are possible; interactive terminals for performing such other transactions can be implemented without departing from the scope of the present invention.

Figure 2:
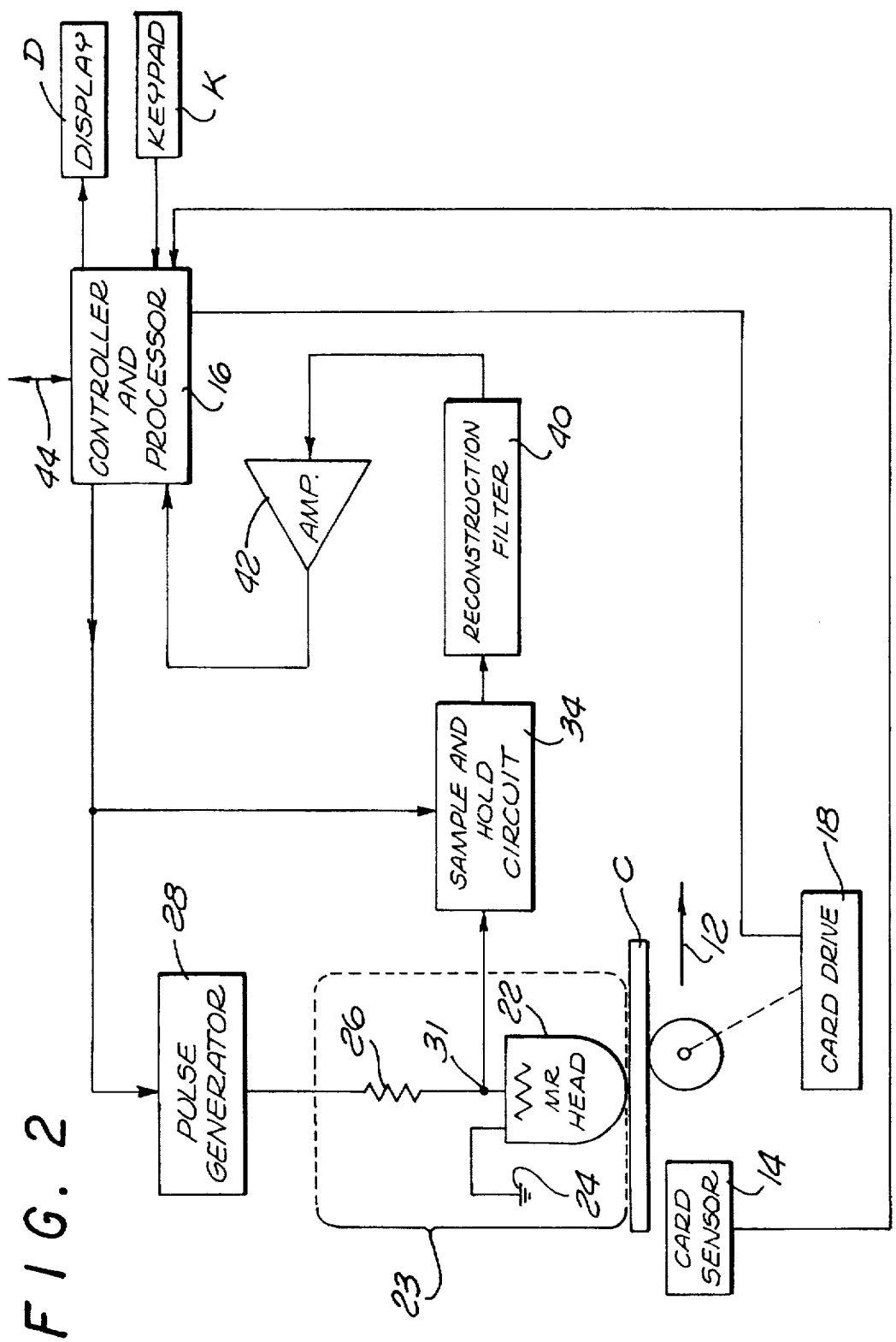
FIG. 2 is a circuit and functional block diagram of the interactive terminal of FIG. 1.

Referring generally to FIG. 2, as the card C (left, lower center) enters the slot S (FIG. 1), a card sensor 14 (FIG. 2), which can be electronic (e.g., optical or magnetic) or mechanical (e.g. a microswitch) detects the presence of the card C. The card sensor 14 passes an enabling signal to a controller and processor 16 (upper right), which in turn activates a card drive 18 (lower left).

The card drive 18 incorporates a mechanism for moving the card; that mechanism is symbolically represented by a single drive roller 20. The card drive 18 moves the card C through a path adjacent to a magnetoresistive ("MR") read head 22 for the purpose of scanning the information stored on the stripe 10.

As the card C moves in a stripe-scanning relationship with respect to the MR read head 22, the controller and processor 16 prompts the system to begin reading data from the card by activating a pulse generator 28, which is coupled through a resistor 26 to the MR read head 22. Accordingly, as the card C passes under the head 22, the pulse generator 28 applies a pulse train 30 (FIG. 3) having a relatively low duty cycle to the MR read head 22, thereby intermittently energizing the head.

As discussed above, the resistance of the MR read head 22 varies in response to the magnetic field the head 22 intercepts from the adjacent card stripe 10. Accordingly, the head 22 and the resistor 26 function as a voltage divider 23 to provide a varying voltage at a junction or terminal 31. This varying voltage serves as a data signal for further processing in accordance with the present invention.

Because of the relatively low duty cycle of the pulse train 30, the MR read head 22 passes electrical current for only part of the time. Thus, the average overall power consumption of the read head 22 is reduced to a level somewhat related to the duty cycle of the drive signal. For example, if a hypothetical MR head consumes 25 milliwatts of power (corresponding to five milliamperes at five volts) when power is applied full-time in a system similar to the disclosed embodiment, the same MR head utilized in a system according to the present invention could consume only approximately 2.5 milliwatts at a ten percent duty cycle.

The magnetic pattern recorded on the stripe 10 generally represents information manifested as a sequence of bits, wherein each bit is indicated by the presence or absence of a magnetic pole. This magnetic pattern can be sensed by scanning the read head 22 across the magnetic pattern, so that the individual bits pass sequentially adjacent to the head. For a given transducing system, the maximum speed at which the bits pass the MR head 22 can be considered the maximum bit rate of the magnetic pattern. However, since the information stored in the magnetic pattern can include abrupt magnetic polarity transitions, the useful frequency spectrum of such a magnetic pattern might not be restricted to the frequency of the magnetic pattern itself; it can have harmonics. Harmonics, which are relatively high-frequency signal components, tend to preserve the sharpness of the magnetic polarity transitions. Hence, in the presence of harmonics, the magnetic pattern also has an upper frequency of interest, which may be significantly higher than the maximum bit rate. As discussed in further detail below, the frequency of the pulse train 30 should be higher than at least the maximum bit rate (so that bits are not missed between power pulses) and is preferably higher than the upper frequency of interest.

Recapitulating to some extent, as the stripe 10 (FIG. 1) passes under the MR head 22 (FIG. 2), the varying resistance of the head 22 modulates the intermittent current resulting from the power pulses. Accordingly, power pulses by the generator 28 produce signals at the terminal 31, the amplitude of which reflect the resistance of the MR head 22, which in turn is related to the field experienced from the stripe 10.

Figure 3:
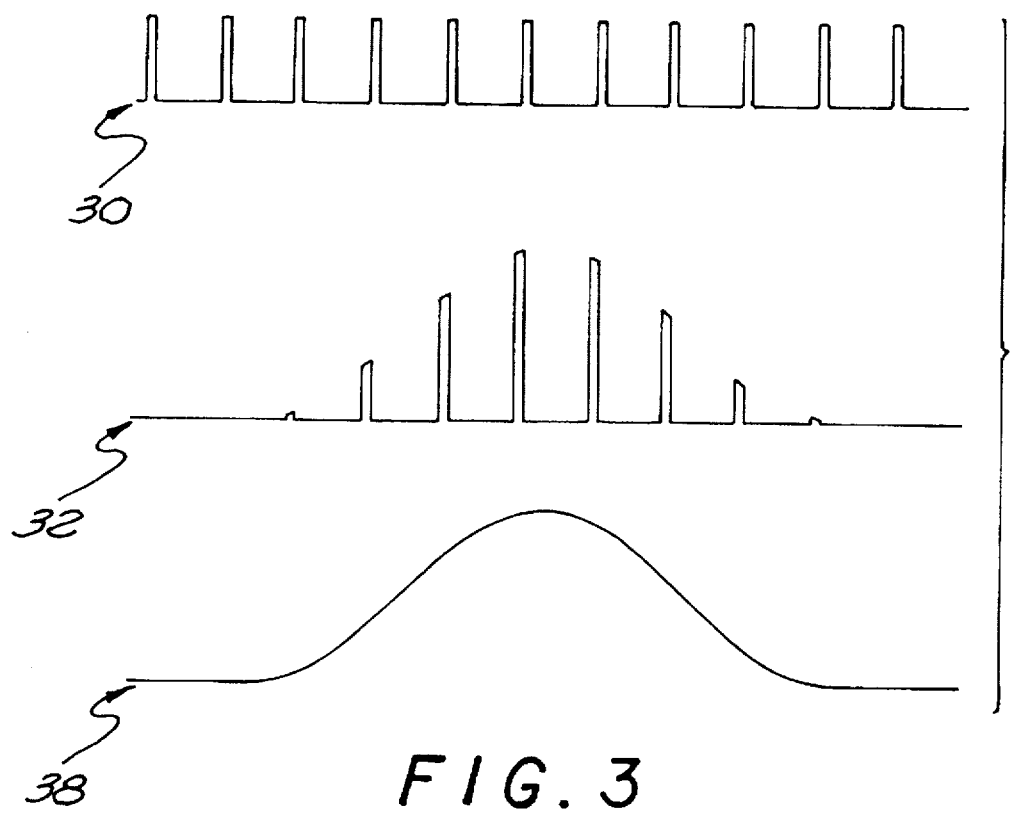
FIG. 3 is a graph illustrating the relationships among various exemplary signals developed in the interactive terminal of FIG. 1.

Thus, as a result of the power drive pulses, the MR read head 22 generates an intermittent value signal 32 (FIG. 3). Representative of a data pulse, the signal 32 is shown as a positive-going half sine wave. The signal 32 is passed to a synchronized sample-and-hold circuit 34 (FIG. 2). The sample-and-hold circuit 34 may take a form as well known in the electronics art, and is managed by the controller and processor 16. For each pulse in the pulse train 30 (FIG. 3), the sample-and-hold circuit 34 holds the value signal 32 at a substantially constant level until the next power pulse is received. In this way, quantized analog samples are provided which are representative of the original recorded information.

It should be understood that the MR read head 22 and related circuitry may require some settling time after being activated by the pulse generator 28. If the intermittent signal 32 is to be digitally sampled, a short time delay should be inserted between the onset of a power pulse and the utilization of a sample by the sample-and-hold circuit 34. On the other hand, if an analog sample-and-hold circuit 34 is utilized, undesirable transients will largely be averaged out over the duration of a power pulse.

The quantized samples are passed by the sample-and-hold circuit 34 to a reconstruction filter 40. As is well known in the art, the reconstruction filter 40 can be a low-pass brick-wall filter of conventional analog or digital design, providing at its output a reconstructed signal 38 (FIG. 3) showing the half sine wave.

In the disclosed embodiment, the reconstruction filter 40 has a cutoff frequency between the upper frequency of interest in the magnetic pattern and the drive frequency of the pulse train 30. In one embodiment, the cutoff frequency of the reconstruction filter 40 is higher than the third harmonic frequency of the magnetic pattern and lower than half of the drive frequency of the pulse train 30. Consequently, in such an embodiment, the drive frequency of the pulse train 30 should be greater than or equal to eight times the maximum bit rate of the magnetic pattern. However, the precise frequency of the pulse train 30 is not critical with respect to variable factors such as the speed of the card C, as long as the relationships discussed above are observed. Thus, it may not be necessary to precisely synchronize the present system to the media speed, making it possible to utilize fixed frequencies for the pulse train 30 and the reconstruction filter 40. This could reduce the potential complexity and expense of a system according to the present invention.

However, it should be recognized that, while a fixed drive frequency and a fixed reconstruction filter cutoff frequency would reduce the complexity of the present invention, it may be advantageous for other reasons to provide a variable drive frequency, a variable duty cycle, and/or a dynamic reconstruction filter. As long as the relationships noted above are observed for lower and upper frequency bounds, an adaptive system might prove useful in various situations, including but not limited to: altering the power consumption dynamically according to observed characteristics; altering the drive frequency to reflect the media speed, data density, signal quality, or rate of change of the signal; and dynamically altering the filter characteristics to provide the best-quality reconstructed signal.

Emerging from the filter 40, the reconstructed signal is passed to an amplifier 42, which processes the signal for further use in the controller and processor 16. For example, the controller and processor 16 can decode the reconstructed signal 38 (pulse) into digital data, and on the basis of that data interact with a user via the display D and the keypad K (FIGS. 1 and 2). A card processing terminal according to the present invention can thus verify the identity of the user by accessing a database internal to the controller and processor 16 or at a central location via an external data link 44.

The signals developed at various stages of operation of an embodiment of the present invention are illustrated in FIG. 3. When the card C is present, the pulse train 30 is generated by the pulse generator 28 (FIG. 2) and applied to the voltage divider 23 comprising the fixed resistor 26 and the MR head 22. The intermittent value signal 32 (FIG. 3) then becomes available at the terminal 31 (FIG. 2). The intermittent value signal 32 is sampled and held by the sample-and-hold circuit 34 at each pulse in the pulse train 30, thereby providing a sequence of quantized analog samples (not shown). The quantized samples are further processed by the reconstruction filter 40, yielding the reconstructed signal 38 (FIG. 3) which approximates a flux change of the original magnetic pattern representative of digital data on the magnetic medium.

MR read heads can be relatively fast. With current technology, such heads are often capable of slew rates of up to 10 MHz. Moreover, MR heads typically are not adversely affected by the use of a pulsed power source; the output signal tends to settle relatively quickly. For example, it has been found to be possible to operate a system according to the present invention at approximately 1 MHz with a ten percent duty cycle. It is likely that even faster rates and better response will be available from MR heads in the future. However, in one embodiment, it has been determined that a relatively conservative system according to the present invention can operate at a pulse rate of approximately 100 kHz with a ten percent duty cycle, permitting a recorded signal of up to approximately 12.5 kHz to be read relatively clearly.

In the illustrative embodiment, the controller and processor 16, the pulse generator 28, the sample-and-hold circuit 34, the reconstruction filter 40, and the amplifier 42 are depicted as separate functional units. It should be understood, however, that some or all those functions can be performed by a single special-purpose or general purpose digital computer, such as a digital signal processor. In such a case, the sample-and-hold circuit should incorporate an analog-to-digital converter, so that the remainder of the signal processing can take place in the digital domain.

It should also be noted that a system according to the present invention is not limited to transducing data-bearing magnetic cards. Modifications to the disclosed system can easily be made to accommodate magnetic tape, disks, and other types of media.

In view of the above explanation of the exemplary system, it will be appreciated that embodiments of the present invention may be employed in many different applications to facilitate transducing a magnetic medium. While certain exemplary structures and operations have been described herein, the appropriate scope hereof is deemed to be in accordance with the claims as set forth below.

What is claimed is:

1. A dynamic magnetic system for transducing a magnetic medium with regard to recorded information having a predetermined maximum bit rate and upper frequency of interest, comprising:

a magnetoresistive transducer head;

a drive mechanism for positioning said magnetic medium in scan sensing relationship with said magnetoresistive transducer head;

a pulse generator coupled to electrically drive said magnetoresistive transducer head with a drive signal having a drive frequency higher than the upper frequency of interest for said recorded information;

a signal processor coupled to said head; and a controller and processor coupled to said signal processor for receiving and processing said recorded information.

2. A dynamic magnetic system according to claim 1, wherein said drive signal has a duty cycle of less than approximately 50%.

3. A dynamic magnetic system according to claim 1, wherein said drive frequency is substantially constant.

4. A dynamic magnetic system according to claim 3, wherein said drive frequency is greater than approximately twice said upper frequency of interest.

5. A dynamic magnetic system according to claim 4, wherein said upper frequency of interest is a third harmonic of said recorded information.

6. A dynamic magnetic system according to claim 3, wherein said drive frequency is greater than approximately 8 times said maximum bit rate.

7. A dynamic magnetic system according to claim 6, wherein:

said maximum bit rate is approximately 10 kHz; and said drive frequency is approximately 100 kHz.

8. A dynamic magnetic system according to claim 1, wherein said signal processor comprises a sample-and-hold unit responsive to said drive signal.

9. A dynamic magnetic system according to claim 8, wherein said signal processor further comprises a reconstruction filter having a cutoff frequency.

10. A dynamic magnetic system according to claim 9, wherein said cutoff frequency is greater than approximately 4 times the maximum bit rate and less than approximately half of the drive frequency.

11. A dynamic magnetic system according to claim 9, wherein said reconstruction filter comprises a low-pass brick-wall filter.

12. A dynamic magnetic system according to claim 1, further comprising a keypad for data entry.

13. A dynamic magnetic system according to claim 12, further comprising a display unit.

14. A dynamic magnetic system for transducing a magnetic medium with regard to recorded information having a predetermined maximum bit rate, comprising:

a magnetoresistive transducer head located contiguous to said magnetic medium;

a power source coupled to electrically drive said magnetoresistive transducer head with a drive signal having a drive frequency greater than approximately 8 times said maximum bit rate and a duty cycle of less than approximately 50%;

a signal processor coupled to said magnetoresistive transducer head to operate at said drive frequency, said signal processor comprising a sample-and-hold unit responsive to said drive signal, a low-pass brick-wall reconstruction filter having a cutoff frequency greater than approximately 4 times the maximum bit rate and less than approximately half of the drive frequency, and an amplifier; and a controller coupled to said signal processor for receiving and processing said recorded information.

* * * * *